Patented June 23, 1953

2,643,263

UNITED STATES PATENT OFFICE 2,643,263

HIGHER SECONDARY-ALKYL ORTHOSILICATES

Clarence Richard Morgan, Marblehead, Mass., assignor, by mesne assignments, to California Research Corporation, San Francisco, Calif., a corporation of Delaware No Drawing. Application September 22, 1950, Serial No. 186,322

4 Claims. (Cl. 260—448.8)

This invention relates to new compositions of matter comprising branched chain orthosilicates containing branched chain alkyl radicals having from 6 to 18 carbon atoms in the molecule and to processes for using the same.

These orthosilicates are generally characterized by being relatively clear or light colored liquids in purified form having high boiling points, and low freezing points or pour points. They are highly resistant to hydrolysis and will not hydrolyze even though boiled with water for extended periods. They are also thermally stable and highly resistant to oxidation. These liquids have from a mild to no odor at all.

In the definition of these orthosilicates it should be noted that the expression "ortho" is intended to designate a single silicon atom with four radicals attached thereto as distinguished from the polymeric structure where the silicon atoms are linked through oxygen bridges.

The United States patent to George D. Graves No. 2,053,474 of September 8, 1936 describes certain straight chain orthosilicates containing esterifying radicals in the molecule having from 8 to 14 carbon atoms. These straight chain radicals are prepared from normal alcohols and while the orthosilicates therein described may be satisfactory for use as plasticizers and for the other uses described in this patent their freezing points are too high for the use of these liquids as heat transfer media over wide temperature ranges; for use as internal combustion engine coolants; for use as hydraulic fluids in aircraft; for use in torque transfer devices; for use in fluid transmissions; for use in hydraulic brakes; for use in hydraulic shock absorbers; for use as lubricants; and the like. The liquids of the present invention are particularly suitable for these uses because of their fluidity over wide temperature ranges; their resistance to hydrolysis and oxidation; and their lubricity.

I have found that a most unexpected combination of characteristics is obtained in orthosilicates having branched chain radicals in the molecule containing from 6 to 18 carbon atoms. Such liquids are characterized by low freezing points or pour points and at the same time have high boiling points. Further, these liquids are extremely resistant to hydrolysis, and oxidation; are thermally stable; and have excellent lubricity. These unexpected characteristics give these liquids qualities which make them particularly suitable for the several uses enumerated above.

One of these orthosilicates, a process for preparing the same, and methods for using it have already been described in my copending application Serial No. 77,981 filed February 23, 1949 for "Tetra 2-Ethylhexyl Orthosilicate and Processes for Using the Same"; others of these orthosilicates have been described in my copending applications Serial Nos. 100,949 and 100,952 filed June 23, 1949 and the present application is a continuation-in-part thereof.

In preparing esters having from 6 to 18 carbon atom branched chain radicals I employ the corresponding alcohol and have found that two procedures may be employed, the first of which produces a liquid of higher acidity than the second. Since I believe that acidity in these orthosilicates catalyzes hydrolysis I prefer the second process but both of these processes will be described in more detail below. I have synthesized esters in this range from the following alcohols to obtain the desired branched chain radicals, namely, 2-ethylbutyl, methyl isobutylcarbinol, 2-methylpentyl, 3-heptanol, 2-heptanol, "iso-octyl," 2-ethylhexyl, mixed "nonyl," "undecyl" and "octadecyl."

The first method of preparing these esters is by the drop wise addition at room temperatures of silicon tetrachloride to an approximate 2–3% excess of the alcohol with stirring. After all of the silicon tetrachloride is added into the alcohol the reaction mixture is slowly heated to temperatures in the neighborhood of 150° C.–250° C. using a stream of inert gas to facilitate the removal of hydrogen chloride. When all chemical reaction has been completed, as evidenced by the essential completion of the evolution of hydrogen chloride, the mixture is then distilled at reduced pressure to remove excess alcohol and is further distilled to isolate the desired orthosilicate.

In the second process of preparing these liquids, and the process which I presently prefer because of the low acidity of the orthosilicates produced, tetra ethyl orthosilicate is mixed with a small excess of the calculated quantity of the alcohol and the temperature of the mixture is slowly raised to that point where ethyl alcohol is distilled from the reaction mixture at a steady rate. A small quantity of sodium methylate may be used as a catalyst to accelerate the displacement of ethyl alcohol. When the calculated quantity of ethyl alcohol has been removed the desired orthosilicate is isolated by distillation at reduced pressure.

The orthosilicates produced by these processes have from 6 to 18 carbon atoms in the branched chain radical and have the following structure:

$$(RO)_4Si$$

where R for example is:

(1) 

for tetra 2-ethylbutyl orthosilicate;

(2) 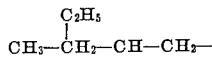

for tetra 1,3-dimethylbutyl orthosilicate;

(3) 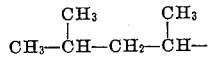

for tetra 2-methylpentyl orthosilicate;

(4) 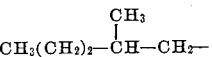

for tetra 1-ethylpentyl orthosilicate;

(5) 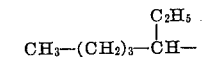

for tetra 1-methylhexyl orthosilicate;

(6) Mixed 8 carbon alkyl radicals containing on the average two side chain groupings on a carbon chain 4 to 6 carbon atoms in length for tetra "iso-octyl" orthosilicate;

(7) 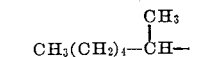

for tetra 2-ethylhexyl orthosilicate (8) Mixed 9 carbon alkyl radicals, containing 3,5,5-trimethylhexyl; 2-isopropyl-3,3-dimethylbutyl; 2,2,4,4-tetra methylpentyl radicals for tetra "nonyl" orthosilicate;

(9) 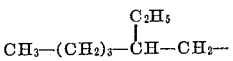

for tetra "undecyl" orthosilicate (tetrakis [1-methyl-4-ethyloctyl]orthosilicate);

(10)
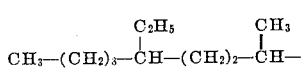
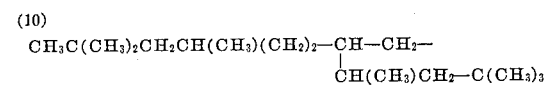

tetra "octadecyl" orthosilicate (tetrakis[2(1,3,3-trimethylpropyl)-5,7,7-trimethyloctyl] orthosilicate).

Tetra 2-ethylbutyl orthosilicate has a boiling point at atmospheric pressure of approximately 600° F. and a boiling point 145–149° C. at 0.3 mm. mercury pressure, a pour point below −100° F., has a viscosity at 210° F. of approximately 1.67 centistokes, a viscosity at 100° F. of approximately 4.04 centistokes, and a viscosity at −40° F. of approximately 65.6 centistokes.

Tetra 1,3-dimethylbutyl orthosilicate has an atmospheric boiling point of approximately 518° F. and a boiling point of 136–143° C. at 0.8–1.6 mm. mercury pressure, has a pour point below −100° F., has a viscosity at 210° F. of approximately 1.56 centistokes, a viscosity at 100° F. of approximately 3.92 centistokes and a viscosity at −40° F. of approximately 138 centistokes.

Tetra 2-methylpentyl orthosilicate has an atmospheric boiling point of approximately 615° F., has a pour point below −100° F., has a viscosity at 210° F. of approximately 1.83 centistokes; has viscosity at 100° F. of approximately 4.85 centistokes; and a viscosity at −40° F. of approximately 132 centistokes.

Tetra 1-ethylpentyl orthosilicate has an atmospheric boiling point approaching 515° F. and a boiling point of 157–160° C. at 0.7 mm. of mercury pressure; a pour point below −100° F.; a viscosity at 210° F. of 2.34 centistokes; at 100° F. of 4.03 centistokes; and at −40° F. of 296 centistokes.

Tetra 1-methylhexyl orthosilicate has an atmospheric boiling point approximating 648° F. and has a boiling point of 192–195° C. at 5 mm. mercury pressure; a freezing point below −100° F.; and has a viscosity at 210° F. of 1.90 centistokes, at 100° F. of 5.3 centistokes, and at −40° F. of 194 centistokes.

Tetra "isooctyl" orthosilicate is prepared from a mixed alcohol of branched chain 8 carbon alcohols and boils in the range 665–680° F. at atmospheric pressure and has a boiling point of 194–201° C. at 5 mm. of mercury pressure; has a pour point less than −100° F.; has a viscosity at −40° F. of approximately 391 centistokes; at 100° F. of 8.3 centistokes; and at 210° F. of 2.8 centistokes.

Tetra 2-ethylhexyl orthosilicate has a boiling point in the range of 191–192° C. at .9 mm. mercury pressure which is approximately 690° F. at 760 mm. of mercury pressure. Its viscosity at 210° F. approaches 2.36 centistokes, at 100° F. approaches 6.83 centistokes, and at −40° F. approaches 260 centistokes. Its pour point is below −100° F. and no crystallization was noted at the lowest temperatures available using Dry Ice.

Tetra "nonyl" orthosilicate prepared from a mixture of alcohols each having branch chain 9-carbon alkyl radicals boils at temperatures too high for a determination of atmospheric boiling point: boiling point at 0.35 mm. mercury 413–419° F.; has a pour point less than −90° F.; and its viscosity at 210° F. is 3.92 centistokes, at 100° F. is 15.0 centistokes, and at −40° F. is 1392 centistokes.

Tetra "undecyl" orthosilicate has an atmospheric boiling point approaching 730° F. with decomposition and a boiling point of 214–216° C. at 0.1 mm. of mercury pressure; a pour point approaching −40° F.; and its viscosity at 210° F. approaches 4.2 centistokes and its viscosity at 100° F. approaches 19.5 centistokes.

Tetra "octadecyl" orthosilicate has a boiling point in the range 528–532° F. at .2 mm. of mercury pressure, it not being practical to determine its atmospheric boiling point. This orthosilicate has a pour point of 38° F. and has viscosities at 100° F. of 621 centistokes and at 210° F. of 27.8 centistokes.

The properties described above for these organic orthosilicates make them very useful as heat transfer media over wide temperature ranges because of their low freezing points or pour points; their high boiling points; their resistance to oxidation and their good thermal stabilities. They have also proved particularly useful as internal combustion engine coolants. They are also useful as fluids for operating many mechanisms over wide ranges of climatic temperatures including uses as hydraulic fluids in aircraft; uses in torque transfer devices; uses in fluid transmissions; uses in hydraulic brakes; uses in hydraulic shock absorbers and for many other uses and purposes. Their lubricity characteristics also make them extremely good base lubricants or additives to lubricants.

Various modifications of these liquids, of their uses, and of the processes for obtaining the same are possible within my inventive concept and reference should be had to the appended claims to determine the scope of my invention.
What is claimed is:

1. As new chemical compounds, orthosilicates containing secondary branched chain alkyl radicals having from 6 to 10 carbon atoms in the molecule.

2. A new chemical compound, tetra 1,3-dimethylbutyl orthosilicate having an atmospheric boiling point of approximately 518° F. and a pour point below −100° F.

3. As a new chemical compound, tetra 1-ethylpentyl orthosilicate having an atmospheric boiling point of approximately 515° F. and a pour point below −100° F.

4. As a new chemical compound, tetra 1-methylhexyl orthosilicate having an atmospheric boiling point of approximately 648° F. and a pour point below −100° F.

CLARENCE RICHARD MORGAN.

References Cited in the file of this patent

UNITED STATES PATENTS

| Number | Name | Date |
|---|---|---|
| 2,477,779 | Zerner | Aug. 2, 1949 |
| 2,490,691 | Langkammerer | Dec. 6, 1949 |